Jan. 2, 1951 G. E. DATH 2,536,265
SHOCK ABSORBER FOR RAILWAY CAR TRUCKS
Filed Feb. 4, 1949
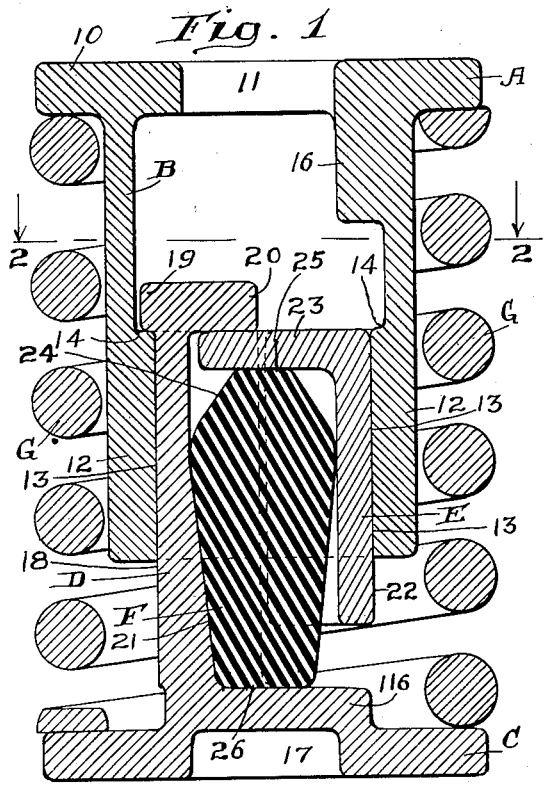
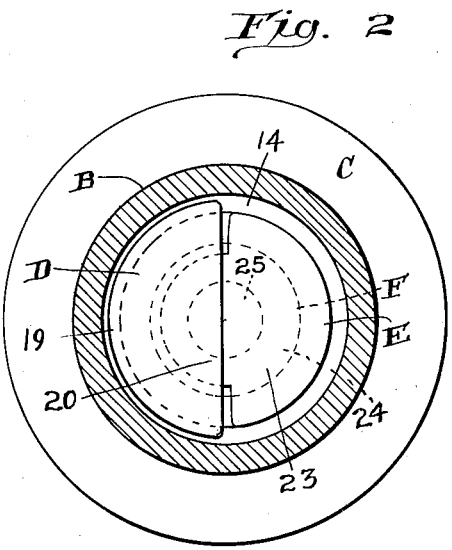
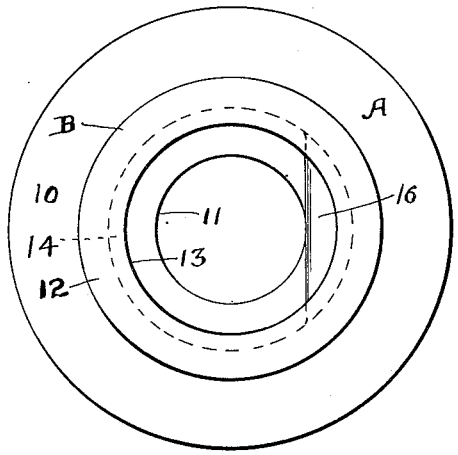
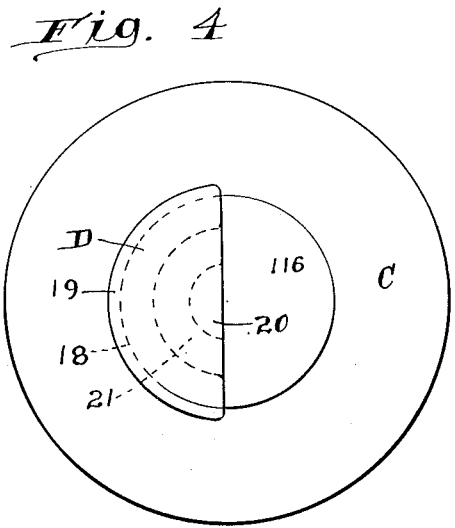
Inventor.
George E. Dath.
By Henry Fuchs.
Atty.

Patented Jan. 2, 1951

2,536,265

UNITED STATES PATENT OFFICE 2,536,265

SHOCK ABSORBER FOR RAILWAY CAR TRUCKS

George E. Dath, Mokena, Ill., assignor to W. H. Miner, Inc., Chicago, Ill., a corporation of Delaware Application February 4, 1949, Serial No. 74,539

7 Claims. (Cl. 267—9)

1

This invention relates to improvements in shock absorbers especially adapted for use as snubbing devices in connection with railway car truck springs.

One object of the invention is to provide a friction shock absorber of simple design for dampening the action of truck springs of railway cars, comprising a friction casing, friction shoes slidingly telescoped within the casing, and a rubber element for spreading the shoes apart and holding the same in tight frictional engagement with the casing, wherein means is provided for increasing the resistance of the mechanism during the last part of the compression stroke.

A more specific object of the invention is to provide a friction shock absorber, as set forth in the preceding paragraph, wherein the shoes are relatively movable with respect to each other during the last part of the compression stroke of the mechanism and the rubber element is distorted through said relative lengthwise movement of the shoes to expand said element and press the shoes against the casing with increased force to increase the resistance of the mechanism, relative lengthwise movement of the shoes being effected by shouldered engagement of the casing with one of the shoes after the mechanism has been compressed to a predetermined extent.

Other objects of the invention will more clearly appear from the description and claims hereinafter following.

In the accompanying drawing forming a part of this specification, Figure 1 is a transverse, vertical sectional view of the improved shock absorber. Figure 2 is a horizontal sectional view, corresponding substantially to the line 2—2 of Figure 1. Figure 3 is a bottom plan view of the friction casing of the improved shock absorber. Figure 4 is a top plan view of the friction shoe at the left hand side of the mechanism, as seen in Figure 1.

As illustrated in the drawing, my improved shock absorber comprises broadly a top follower A; a friction casing B formed rigid with said top follower; a bottom follower C; a pair of friction shoes D and E slidingly telescoped within the casing B, the shoe D being rigid with the bottom follower C and the shoe E being movable with respect to the shoe D and the follower C; a rubber block F under compression between the shoes; and a coil spring G surrounding the casing B and bearing at its opposite ends on the followers A and C.

The top follower A is in the form of a rela-

2 tively heavy, circular disc, having the friction casing B formed integral therewith and depending therefrom. The casing B is in the form of a cylindrical tubular member, open at its lower end and partly closed at its upper end, the follower A forming the top end wall of the casing. As shown in Figures 1 and 3, the follower A projects laterally outwardly from the casing, thereby providing an annular follower flange 10 at the upper end of said casing. The follower A is provided with a central opening 11 therethrough, adapted to accommodate the usual spring centering projection, not shown, of the top spring follower plate of a truck spring cluster of a railway car.

The casing B has the side wall thereof inwardly thickened at its lower end, as shown most clearly in Figure 1, to provide a friction shell section 12, presenting an interior, cylindrical friction surface 13. The inwardly thickened portion of the casing B provides an annular stop shoulder 14 at the inner end of the shell section 12 for a purpose hereinafter pointed out. The side wall of the casing B at the right hand side thereof, as seen in Figure 1, is inwardly enlarged or thickened, to provide a luglike projection 16 at the upper end thereof for actuating the shoe E. This luglike projection 16 is spaced an appreciable distance from the inner end of the friction shell section 12 of the casing, as shown in Figure 1.

The bottom follower C is in the form of a relatively heavy, circular disc of the same outside diameter as the follower A and has the shoe D formed integral therewith and upstanding therefrom, the shoe D being formed on an upstanding central boss 116 on the follower C. The follower C is preferably also provided with an outwardly opening, central seat 17, adapted to accommodate the usual spring centering projection, not shown, of the bottom spring plate of the truck spring cluster.

The shoe D is in the form of a transversely curved plate of substantially semi-cylindrical, transverse cross section, and presents a lengthwise extending, transversely curved friction surface 18 on the outer side, which is in sliding engagement with the interior friction surface 13 of the casing B at the left hand side of the mechanism, as seen in Figure 1. At the upper end, the shoe D has a laterally outwardly projecting stop flange 19 overhanging the stop shoulder 14 of the casing to limit longitudinal separation of the casing and this shoe. On the inner side of the shoe D, at the upper end thereof, is a horizontally extending flange 20, which is in horizontal alignment with the flange 19. The inner surface of the curved platelike shoe D, which surface is indicated by 21, is inclined inwardly in downward direction, as clearly shown in Figure 1.

The shoe E is also in the form of a transversely curved plate of substantially semi-cylindrical cross section, and presents a lengthwise extending, transversely curved friction surface 22 on its outer side, which is in sliding engagement with the interior friction surface 13 of the casing B at the right hand side of the mechanism, as seen in Figure 1. At the upper end, the shoe E is provided with a horizontally disposed, laterally inwardly projecting flange 23 engaged beneath the flange 20 of the shoe D. The shoe E is shorter than the shoe D and has its lower end spaced from the boss 116 of the follower C in the normal expanded condition of the shock absorber.

The rubber block F is in the form of an elongated, downwardly tapered plug, as shown in Figure 1, having its upper end portion contracted to provide an upwardly tapered end section 24. The block F is interposed between the shoes D and E and has flattened top and bottom end faces 25 and 26 bearing, respectively, on the underneath side of the flange 23 of the shoe E and the top side of the boss 116 of the follower C. The block F is under a predetermined amount of initial compression between the shoes D and E and holds the same spread apart in tight frictional engagement with the interior friction surface 13 of the casing B.

The spring G is in the form of a relatively heavy, helical coil surrounding the casing B and having its top and bottom ends bearing, respectively, on the underneath side of the top follower A and the top side of the bottom follower C. The spring G is also preferably under initial compression.

In assembling the shock absorber, the casing B is placed in inverted position, that is, with the follower A resting on a support and the casing upstanding therefrom. The spring G is then placed over the casing B in position resting on the follower A. The assembled unit, comprising the shoes D and E and the rubber block F, in inverted position, is then engaged within the open end of the casing B, the shoe D being tilted to contract the outer end of the unit and permit the flange 19 of the shoe D to freely enter the casing. The mechanism is then forcibly compressed, telescoping the shoes D and E within the casing and forcing the same inwardly of the casing until the stop flange 19 passes the shoulder 14 of the casing and snaps in back of the same to interlock the parts against lengthwise separation.

As will be understood by those versed in this art, my improved shock absorber is substituted for one or more of the spring units of the cluster of truck springs of a railway car and cooperates with the top and bottom spring follower plates of such a cluster. The shock absorber is thus compressed between the body and truck bolsters of the car, together with the other springs of said cluster.

In the operation of my improved shock absorber, upon the springs of the spring cluster of the truck of a railway car being compressed, the casing B is forced downwardly toward the bottom follower C, thus, during the first part of the compression stroke, forcing the shoes D and E inwardly of the casing, opposed by the spring G. Due to the friction existing between the shoes and the casing friction surface, relative movement of the parts is frictionally opposed and the action of the truck springs is effectively snubbed. As compression of the shock absorber progresses, the lug 16 of the casing B comes into engagement with the shoe E, forcing the same downwardly in unison with the casing and compressing the rubber block F lengthwise against the bottom follower C, causing the block to expand radially and placing the shoes D and E under progressively increasing additional pressure. The frictional resistance between the shoe D and the casing B is thus greatly increased during the last part of the compression stroke of the device, thereby correspondingly increasing the snubbing capacity of the same. Compression of the shock absorber is finally limited by engagement of the lower end of the casing B with the bottom follower C. Upon recoil of the truck springs, the actuating pressure on the top follower A is reduced, thus permitting return of the parts to the normal position shown in Figure 1 by the expansive action of the spring G and the resilient rubber block F.

I claim:

1. In a shock absorber, the combination with a friction casing; of a pair of friction shoes slidingly telescoped within said casing; yielding means between said shoes opposing lengthwise movement of said shoes with respect to each other; yielding means between said casing and one of said shoes for opposing relative movement of said casing and said last named shoe toward each other; and abutment means on said casing spaced from the inner end of the remaining shoe a distance less than the length of the full compression stroke of the mechanism to engage the same after compression of the mechanism to a predetermined extent, for moving said last named shoe lengthwise with respect to the other shoe to compress said first named yielding means lengthwise.

2. In a shock absorber, the combination with a friction casing having an interior friction surface; of a pair of friction shoes slidingly telescoped within said casing; a rubber element between said shoes yieldingly opposing lengthwise movement of said shoes with respect to each other, and pressing the shoes apart; yielding means between said casing and one of said shoes for opposing relative lengthwise movement of said casing and said last named shoe toward each other; and abutment means on said casing spaced from the inner end of the remaining shoe a distance less than the length of the full compression stroke of the mechanism to engage said remaining shoe, after compression of the mechanism to a predetermined extent, for moving said last named shoe lengthwise with respect to the other shoe to compress said rubber element lengthwise and expand the same laterally to force said shoes apart against the interior friction surface of said casing.

3. In a shock absorber, the combination with an end follower; of a second end follower, said followers being relatively movable toward each other lengthwise of the mechanism; a friction casing projecting from said first named follower toward the second named follower; a friction shoe projecting from said second named follower toward said first named follower; a second friction shoe, said shoes being slidingly telescoped within the casing, and said shoes being movable lengthwise with respect to each other; a rubber element between said shoes opposing relative lengthwise movement of said shoes with respect to each other, said rubber element being under lateral compression between said shoes for holding the latter spread apart; yielding means between said followers opposing relative movement of said followers toward each other lengthwise of the mechanism; and abutment means on said casing spaced from the inner end of said second named shoe a distance less than the length of the full compression stroke of the mechanism to engage said second named shoe after compression of the mechanism to a predetermined extent for moving said second named shoe lengthwise with respect to said first named shoe to compress said rubber element in lengthwise direction.

4. In a shock absorber, the combination with a friction casing; of a friction shoe slidingly engaged within said casing, said shoe and casing being movable lengthwise with respect to each other; spring means between said casing and shoe opposing relative movement of said casing and shoe toward each other; a second shoe slidingly engaged within the casing, said second named shoe being movable lengthwise with respect to the first named shoe; a rubber element under lateral compression between said shoes, said element having shouldered engagement at opposite ends with said first and second named shoes; and abutment means on said casing spaced from the inner end of said second named shoe a distance less than the length of the full compression stroke of the mechanism to engage said second named shoe after the mechanism has been compressed to a predetermined extent for moving said shoe lengthwise toward the first named shoe to compress said rubber element in lengthwise direction.

5. In a shock absorber, the combination with a friction casing having a follower at its outer end; of a friction shoe having a follower at its outer end; a second friction shoe, said shoes being slidingly telescoped within the casing, said second shoe being movable lengthwise with respect to said first named shoe; a rubber pad under lateral compression interposed between said shoes, said rubber pad bearing at one end on said follower of said first named shoe; an inturned flange at the inner end of said second named shoe bearing on the other end of said rubber pad; and an interior shoulder on said casing spaced from the inner end of said second named shoe a distance less than the length of the full compression stroke of the mechanism to engage second named shoe after compression of the mechanism to a predetermined extent for forcing said second named shoe lengthwise with respect to the first named shoe toward the follower end of the latter to compress said pad lengthwise.

6. In a shock absorber, the combination with a friction casing having a follower at its outer end; of a friction shoe having a follower at its outer end and an inturned abutment flange at its inner end; a second friction shoe having an inturned abutment flange at its inner end engaged in back of the flange of said first named shoe, said second named shoe being movable toward said first named shoe, said shoes being slidingly telescoped within the casing; a rubber block between said shoes, said block being under lateral compression between the shoes and under lengthwise compression between the flange of said second named shoe and the follower of said first named shoe; an interior lug on said casing normally spaced from the inner end of said second named shoe, said lug being engageable with said second named shoe after the mechanism has been compressed to a predetermined extent to compress said rubber block lengthwise and expand the same laterally; and spring means between said followers yieldingly resisting relative movement of said followers toward each other.

7. In a shock absorber, the combination with a top follower; of a friction casing depending from said follower; a bottom follower; a shoe upstanding from said bottom follower and slidingly engaged within the casing, said shoe having an inturned flange at its inner end; a second shoe slidingly telescoped within the casing and having an inturned flange at its inner end engaged with the flange of said first named shoe to limit upward displacement of said second named shoe with respect to said first named shoe, said shoes being slidable inwardly of the casing; interior abutment means on said casing engageable with said second named shoe to restrict movement of said second named shoe inwardly of the casing to less than the inward movement of said first named shoe; a rubber block under lateral compression between said shoes and bearing at its top and bottom ends, respectively, on the flange of said second named shoe and the bottom follower; and a spring surrounding said casing and bearing at its top and bottom ends, respectively, on said top and bottom followers.

GEORGE E. DATH.

REFERENCES CITED

The following references are of record in the file of this patent:

UNITED STATES PATENTS

| Number | Name | Date |
| --- | --- | --- |
| 1,360,434 | O'Connor | Nov. 30, 1920 |
| 2,216,231 | Dentler | Oct. 1, 1940 |
| 2,220,074 | Blattner | Nov. 5, 1940 |
| 2,242,413 | Blattner | May 20, 1941 |
| 2,379,078 | Haseltine | June 26, 1945 |